(12) United States Patent
Chi et al.

(10) Patent No.: US 7,779,013 B2
(45) Date of Patent: Aug. 17, 2010

(54) SYSTEM AND METHOD FOR DETERMINING A QUANTITATIVE MEASURE OF SEARCH EFFICIENCY OF RELATED WEB PAGES

(75) Inventors: Ed H. Chi, Palo Alto, CA (US); William S. Liu, Cupertino, CA (US)

(73) Assignee: Xerox Corporation, Norwalk, CT (US)

( * ) Notice: Subject to any disclaimer, the term of this patent is extended or adjusted under 35 U.S.C. 154(b) by 494 days.

(21) Appl. No.: 11/267,004

(22) Filed: Nov. 4, 2005

(65) Prior Publication Data

US 2007/0106641 A1 May 10, 2007

(51) Int. Cl.
G06F 7/00 (2006.01)
G06F 17/30 (2006.01)
(52) U.S. Cl. ...................................... 707/748
(58) Field of Classification Search .................. 707/3
See application file for complete search history.

(56) References Cited

U.S. PATENT DOCUMENTS 5,835,905 A * 11/1998 Pirolli et al. .................. 707/3
2003/0074368 A1 * 4/2003 Schuetze et al. ........ 707/103 R

OTHER PUBLICATIONS

D. Gourley et al., "HTTP the Definitive Guide," Ch. 1, pp. 3-22, O'Reilly and Assocs. (2002).
W. Stevens, "TCP/IP Illustrated," vol. 1, Ch. 1 *et seq.*, Addison-Wesley (1994).

* cited by examiner

*Primary Examiner*—James Trujillo
*Assistant Examiner*—Amresh Singh
(74) *Attorney, Agent, or Firm*—Patrick J. S. Inouye; Krista A. Wittman

(57) ABSTRACT

A system and method for determining a quantitative measure of search efficiency of related Web pages. An information goal is specified. A target Web page is identified within a plurality of Web pages. The information goal is searched via a search function in the Web pages to identify potential Web pages that include at least one hyperlink referencing and proximal cues relating to distal content included in another potential Web page. An activation network is formed. A directed graph is built, including nodes corresponding to the potential Web pages and arcs corresponding to the hyperlinks. A weight is assigned to each arc to represent a probability of traversal of the corresponding hyperlink based on a relatedness of keywords in the information goal to the proximal cues. A traversal through the activation network to the node corresponding to the target Web page is evaluated as a quantitative measure of search efficiency.

28 Claims, 8 Drawing Sheets

US 7,779,013 B2

SYSTEM AND METHOD FOR DETERMINING A QUANTITATIVE MEASURE OF SEARCH EFFICIENCY OF RELATED WEB PAGES

The U.S. Government has a paid-up license in this invention and the right in limited circumstances to require the patent owner to license others on reasonable terms as provided by the terms of Contract No. N00014-96-0097 awarded by the Office of Naval Research.

FIELD

This application relates in general to Web site evaluation and, in particular, to a system and method for determining a quantitative measure of search efficiency of related Web pages.

BACKGROUND

The Worldwide Web, or simply, the "Web," has become a form of global information resource that can be easily accessed with just a Web browser and a connection to a wide area internetnetwork, particularly, the Internet. Generally, individual pages of Web content are freely available for browsing and can contain both static and interactive content of multiple media types, particularly, textual and visual content. Web content can be navigated through a read, point, and click procedure to "surf" through successive Web pages to satisfy an information goal. Typically, collections of related Web pages are structured into a hierarchical Web site through hyperlinks that associate distal information contained in a linked Web page through proximal cues contained in the linking Web page.

By virtue of the wide spread acceptance enjoyed by the Web, individuals, businesses, and other interests are placing increasing reliance on the Web as a major means of communication, particularly in the commercial sector where effective advertising, information dissemination, and collaborative data sharing are necessary aspects of electronic commerce. Ensuring user satisfaction is crucial, particularly where revenue is derived, for instance, through advertising for third parties, and where generating traffic through repeat visits is tied to revenue goals.

However, user satisfaction in browsing a particular Web page is subjective. Indirect measures for gauging user satisfaction include capturing click patterns and counting repeat visits, but such measures only provide generalized indications of potential interest level in the Web content. Observable indicia, such as clicks, are not tied to an objective measure of goodness or satisfaction and could equally reflect a random or wrong choice by the user. Similarly, user satisfaction in browsing an entire Web site is also subjective. Click patterns can be traced to identify the most popular hyperlinks, but such measures fail to reflect whether users were satisfied with the results of their visit. Quantifying user satisfaction therefore requires assigning meaning to user actions.

User satisfaction on per page and entire Web site bases can be quantified by tying user satisfaction to an information need or goal. Generally, users visiting a Web site are looking for particular information and will utilize a searching feature to facilitate finding the information sought when individual page navigation through the Web site is not desired. The searching feature can be provided by a Web server either as part of the Web site or by a dedicated search server and the users will stop searching when either the information is found in the search results, a dead end or wrong result is reached, or they give up in their search. Accordingly, search efficiency can be quantitatively measured by determining whether user information needs are being satisfied by the searching feature of the Web pages in a Web site.

Conventional Web site quantitative evaluation focuses on performing traffic analyses. Individual visits are traced and repeat visits are tracked to generate statistics on Web site traffic. Although these measures provide a general idea of user behaviors, such information fails to provide an indication of whether user information needs were met by a searching feature.

Therefore, there is a need for an approach to providing quantitative measures of the goodness of a searching feature for a Web site based on a priori user information needs. Preferably, such an approach would provide an objective measure of the likelihood of satisfying user information needs through searching.

SUMMARY

A system and method for evaluating the quantitative efficiency of a search engine accepts a Web site and an information goal. The Web site includes two or more Web pages that each contain content and one or more hyperlinks referencing another Web page. The information need is provided as a set of weighted keywords. A searching feature provided with the Web site is identified and the information need is submitted to generate a set of search results, which each serve as the starting point of a simulated user traffic flow analysis. A quantified metric is generated in the form of quantitative metrics as the result of the user traffic flow simulation.

One embodiment provides a system and method for determining a quantitative measure of search efficiency of related Web pages. An information goal is specified. A target Web page is identified within a plurality of Web pages. The information goal is searched via a search function in the Web pages to identify potential Web pages that each include at least one hyperlink referencing and proximal cues relating to distal content included in another potential Web page. An activation network is formed. A directed graph is built, including nodes corresponding to the potential Web pages and arcs corresponding to the hyperlinks. A weight is assigned to each arc to represent a probability of traversal of the corresponding hyperlink based on a relatedness of keywords in the information goal to the proximal cues included in the referenced Web page. A traversal through the activation network to the node corresponding to the target Web page is evaluated as a quantitative measure of search efficiency.

A further embodiment provides a system and method for determining a quantitative measure of search efficiency of a Web site. An information goal including one or more keywords is specified. A target Web page in a Web site including a plurality of Web pages is identified. The keywords are submitted into a search prompt provided by the Web site and a set of search results including a plurality of potential Web pages is received. Each potential Web page includes content and at least one hyperlink referencing another potential Web page with proximal cues relating to distal content included in the another potential Web page. A logically-defined activation network is formed. A directed graph is built with nodes corresponding to the potential Web pages and arcs corresponding to the embedded hyperlinks. A weight is assigned to each arc to represent a probability of traversal of the corresponding hyperlink based on a relatedness of the keywords in the information goal to the proximal cues included in the potential Web page. A traversal through the activation network to the node corresponding to the target Web page is evaluated as a quantitative measure of search efficiency, wherein the quantitative measure is determined in accordance with at least one equation selected from the set, comprising:

$$A_i = A_{i-1} \cdot S;$$

$$A_i = \alpha A_{i-1} \cdot S; \text{ and}$$

$$A_i = A_{i-1} \cdot S + E;$$

where S is a starting activation vector representing the activation network, $A_i$ is a successive activation vector determined after i traversals, $\alpha$ is a decay factor, and E is a growth constant.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Web Site Usability Evaluation Environment

Figure 1:
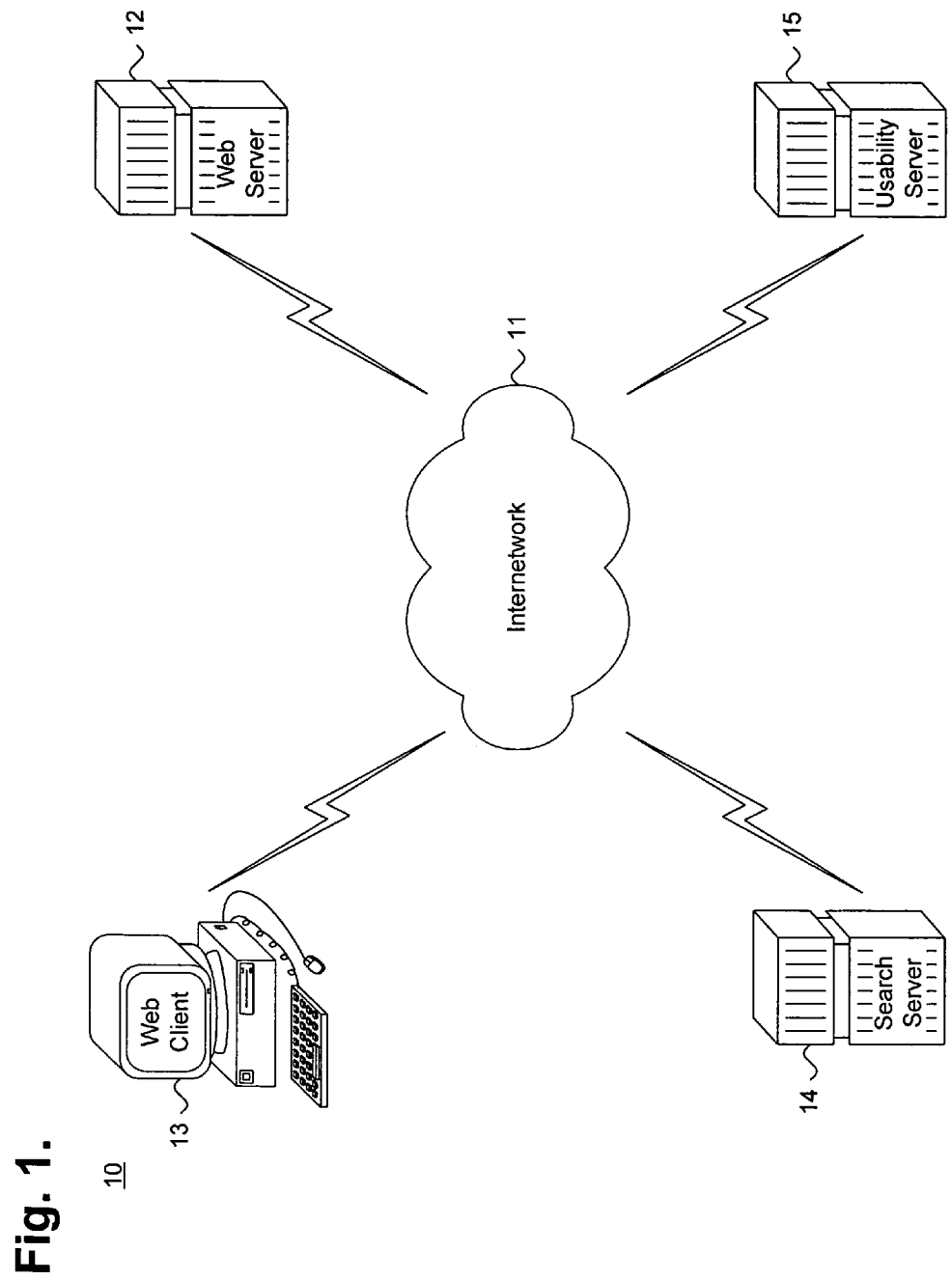
FIG. 1 is a block diagram showing an environment for evaluating the usability of related Web pages.

A Web site is a logical collection of individual Web pages that are connected by unidirectional hyperlinks. Each Web page presents content, which can be static or interactive, of multiple media types, particularly textual and visual content. The usability of a Web site is tied to user satisfaction and search efficiency, which can be quantified by assigning meaning to user actions. FIG. 1 is a block diagram showing an environment 10 for evaluating the usability of a Web site. The Web site is remotely accessed over an internetwork 11, particularly, the Internet, through a Web server 12 that serves each Web page upon request by a Web client 13. Each Web page is written in a suitable variant of a hypertext markup language, for instance, the Hypertext Markup Language (HTML), such as described in D. Gourley and B. Totty, "HTTP The Definitive Guide," Ch. 1, pp. 3-22, O'Reilly and Assocs. (2002), the disclosure of which is incorporated by reference. Additionally, the internetwork 11 is preferably a Transmission Control Protocol/Internet Protocol (TCP/IP) compliant network, such as described in W. R. Stevens, "TCP/IP Illustrated," Vol. 1, Ch. 1 et seq., Addison-Wesley (1994), the disclosure of which is incorporated by reference.

Generally, users visiting a Web site are looking for particular information to satisfy an information need or goal. The Web pages that form a Web site are logically structured into a hierarchy that is navigated through embedded hyperlinks, as further described below with reference to FIG. 2. Each hyperlink leads to further Web content, generally on another Web page. User selection of hyperlinks is guided through proximal cues that provide context surrounding each hyperlink in relation to the Web content provided by the referenced Web page as distal information. Users generally stop searching when either their information goal is satisfied, a dead end or wrong result is reached, or they give up. The loss of users from a Web site is known as the attrition rate.

While each hyperlink provides a direct reference to another Web page, proximal cues can be supplemented by search tools, such as provided by a search server 14, which can accept a query containing one or more keywords to describe an information goal.

Finally, the usability of a Web site can be evaluated by a usability server 15 that, for example, measures the cumulative satisfaction of simulated users searching for a specific information goal, such as described in commonly-assigned U.S. Patent application, entitled "System and Method for Determining a Quantitative Measure of Qualitative Usability of Related Web Pages," Ser. No. 11/266,971, filed Nov. 4, 2005, pending, the disclosure of which is incorporated by reference.

In one embodiment, the Web server 11, Web client 13, search server 14, and usability server 15 are general purpose, programmed digital computing devices that are capable of multi-threaded execution and which include a central processing unit (CPU), random access memory, non-volatile secondary storage, such as a hard drive or CD ROM drive, interfaces to a wired or wireless network, and various peripheral devices, including user interfacing means, such as a keyboard and display. Program code, including software programs, and data is loaded into the memory for execution and processing by the CPU and results are generated for display, output, transmittal, or storage.

Web Page Hierarchy

Figure 2:
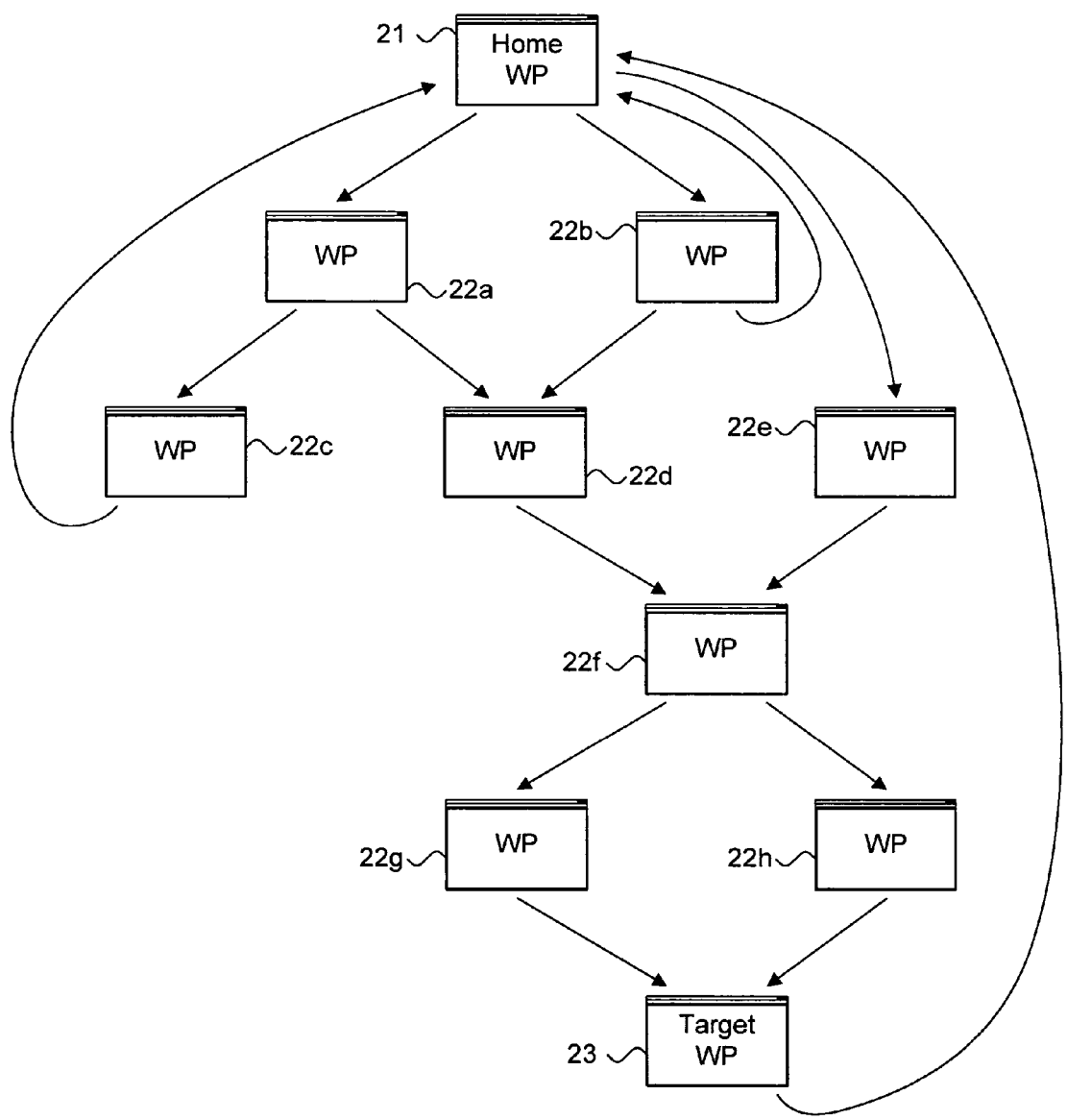
FIG. 2 is a tree diagram showing, by way of example, a hierarchy of Web pages for providing Web content in the environment of FIG. 1.

For simplicity, Web sites are generally structured into a hierarchy that proceeds from a home Web page, frequently identified by a Uniform Resource Locator (URL) provided as the domain name. FIG. 2 is a tree diagram showing, by way of example, a hierarchy 20 of Web pages for providing Web content in the environment 10 of FIG. 1. Other types of Web site structuring are possible, but, in terms of usability, hierarchies are user friendly and more easily navigated and understood than other structuring forms.

The hierarchy 20 represents a Web site that includes a home Web page 21 and a target Web page 23, between which zero or more intermediate Web pages 22*a-h* appear. Each Web page includes content and at least one hyperlink referencing another Web page, either within or outside of the Web site. Through a point-and-click procedure, a user can navigate through the Web site by selecting a hyperlink based on proximal cues to retrieve the distal content contained in the referenced Web page. Each hyperlink is unidirectional and, for purposes of illustration, any terminal Web page not corresponding to the target Web page 23 references back to the home Web page 21.

User satisfaction depends upon whether information needs can be satisfied by a Web site. Usability is affected by ease of navigation. As any given Web page can be referenced by one or more referring Web pages, multiple paths through the hierarchy 20 to the target Web page 23 are possible. However, not every path through the hierarchy 20 provides the best path to the target Web page 23 from the home Web page 21. The proximal cues contained in referring Web pages and the topology of the Web site can affect qualitative usability the Web site and user satisfaction can be simulated to determine an upper bound on improvements contributing to usability, as further described below with reference to FIG. 5.

Home and Target Web Pages

Figure 3:
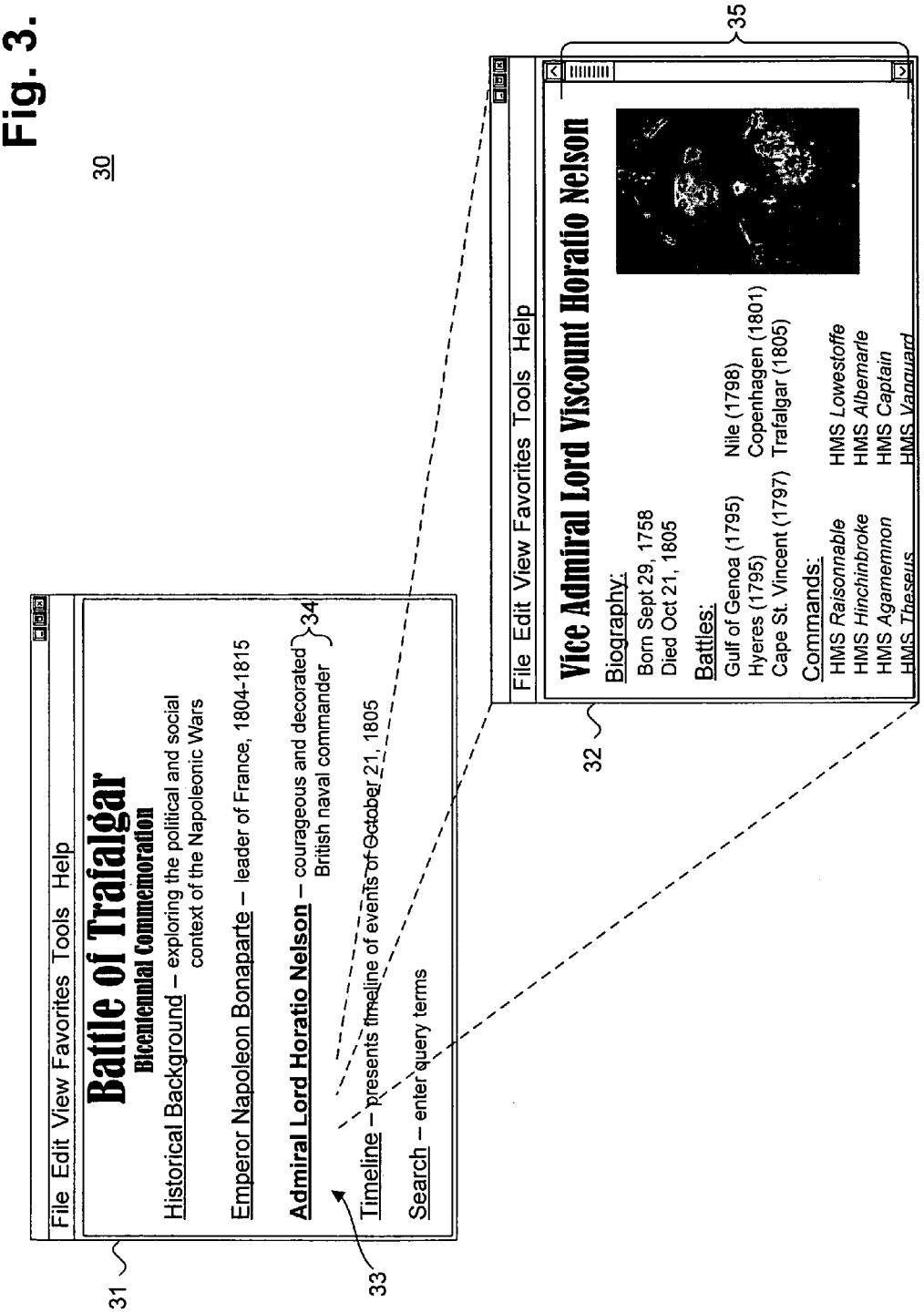
FIG. 3 is a screen diagram showing, by way of example, the home and target Web pages of the Web page hierarchy of FIG. 2.

In one embodiment, user satisfaction of a Web page can be quantified by determining an information scent that measures a user's perception of the value and cost of accessing a particular piece of information. FIG. 3 is a screen diagram 30 showing, by way of example, the home and target Web pages 31, 32 of the Web page hierarchy 20 of FIG. 2. Each Web page can include one or more hyperlinks. For example, the home Web page 31 includes a hyperlink 33 that references target Web page 32. Each Web page also includes content and proximal cues 34 associated with each hyperlink 33 to describe the content, known as distal information 35, that can be found on the Web page referenced by the hyperlink 33.

Searching Web Content

Figure 4:
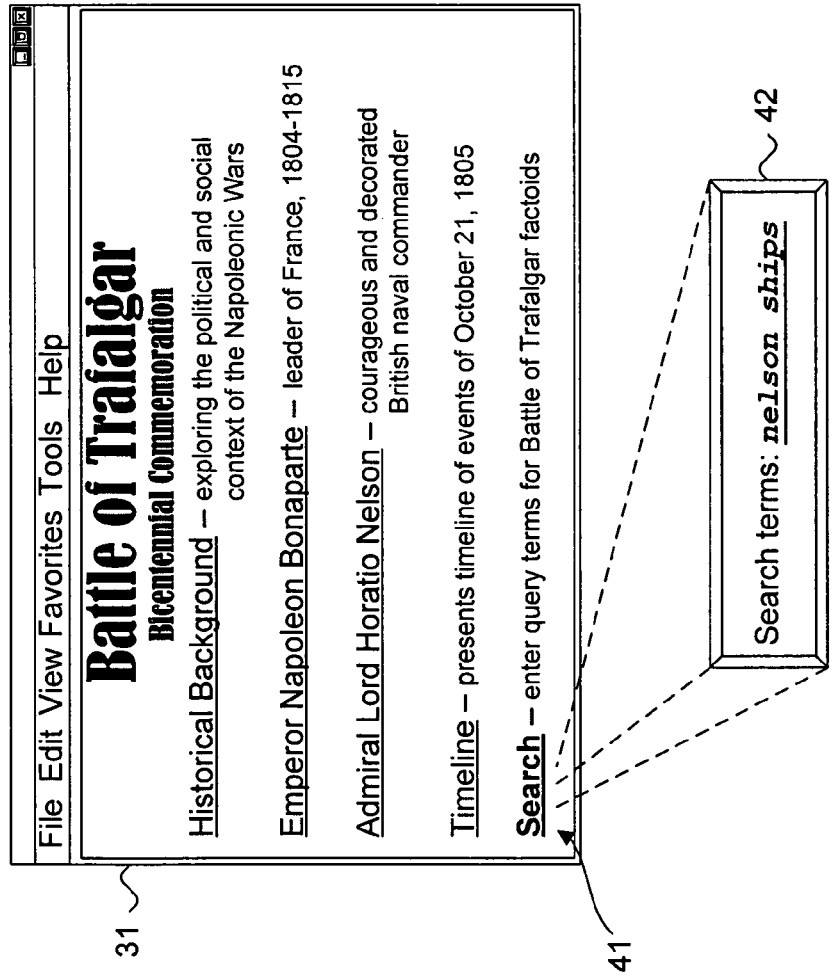
FIG. 4 is a screen diagram showing, by way of example, a search dialogue generated from the home Web page of FIG. 3.

Frequently, a searching feature is available in a Web site, which is provided by a third party search engine that specializes in performing high-speed searches of Web content. Such searches can be limited to a particular Web site or performed globally. FIG. 4 is a screen diagram 40 showing, by way of example, a search dialogue 42 generated from the home Web page 31 of FIG. 3. The search dialogue 42 is provided in response to selection of a search hyperlink 41 and includes provision for accepting search terms, such as the keywords 62$a$-$c$. Other types of search term acceptance means are possible.

Figure 5:
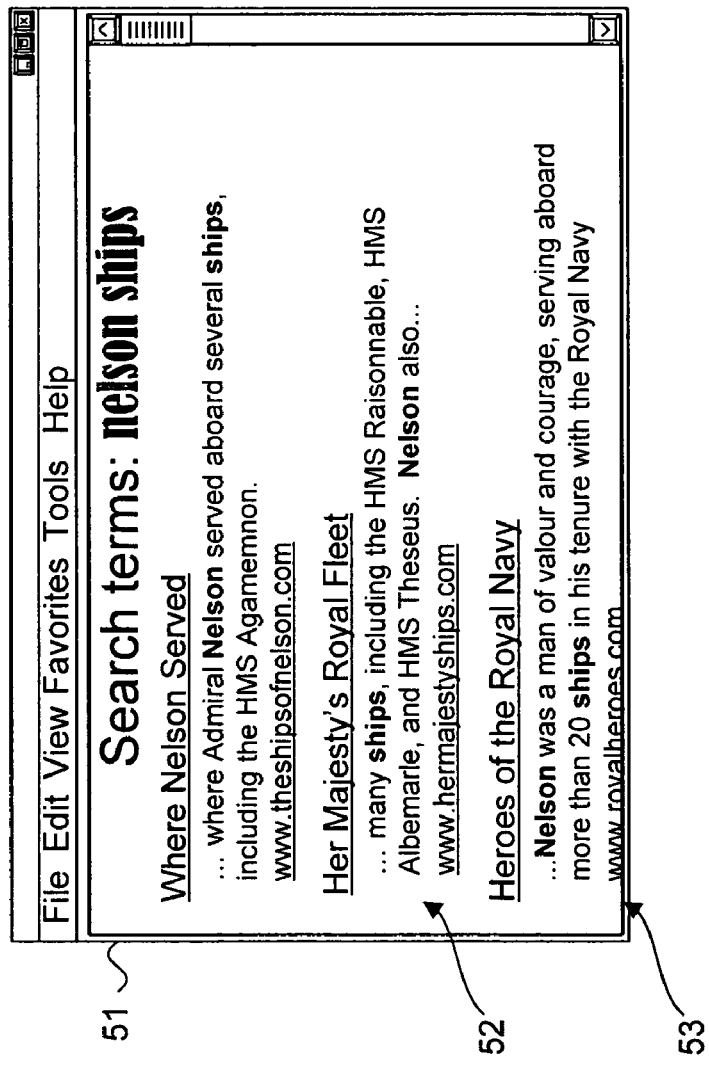
FIG. 5 is a screen diagram showing, by way of example, a Web page containing search results from the search dialogue of FIG. 4.

The search terms submitted through the search dialogue 42 are used by the searching feature to generate a set of search results. In a further embodiment, keyword expansion is applied to the search terms to broaden the coverage of the search beyond the literal keywords, including introducing root word expansion, synonyms, alternate spellings, and the like. Other types of keyword expansions are possible. FIG. 5 is a screen diagram 50 showing, by way of example, a Web page 51 containing search results 52 from the search dialogue 42 of FIG. 4. Each search result 52 includes proximal cues describing the potential distal information provided on the Web page referenced. When more search results 52 appear than can fit within the display space of the Web page 51, the remaining search results (not shown) may be truncated at the bottom of the display area 53, also known as the "fold."

The probability that a user would select any of the search results 52 can be determined by comparing the information goal to the proximal cues accompanying each search result 52. In a further embodiment, a linear bias can be applied to the search results to slightly favor those search results 52 appearing first and the remaining search results 52 in order of decreasing emphasis. In a still further embodiment, those search results 52 that appear below the fold 53 can be similarly discounted.

Weighted Keywords Vector

Figure 6:
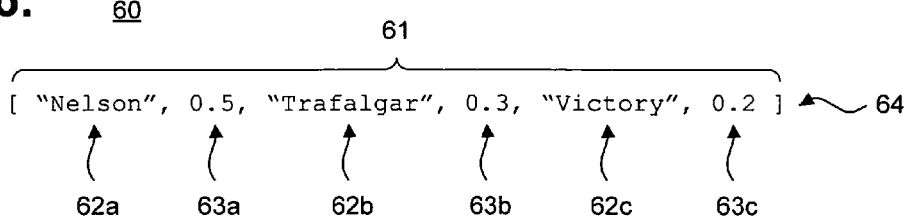
FIG. 6 is a diagram showing, by way of example, a vector of weighted keywords for application against the Web page hierarchy of FIG. 2.

In one embodiment, the usability of a Web site is determined by evaluating the quantified ability of a simulated user to satisfy an information goal. FIG. 6 is a diagram 60 showing, by way of example, a vector 61 of weighted keywords 62$a$-$c$ for application against the Web page hierarchy 20 of FIG. 2. The vector 61 represents the information goal against which the usability of the Web site will be quantified to reflect a user's qualitative satisfaction of each Web site visited. The vector 61 contains one or more keywords 62$a$-$c$ and an associated weight 63$a$-$c$ to signify the relative importance of each keyword.

Activation Network

Figure 7:
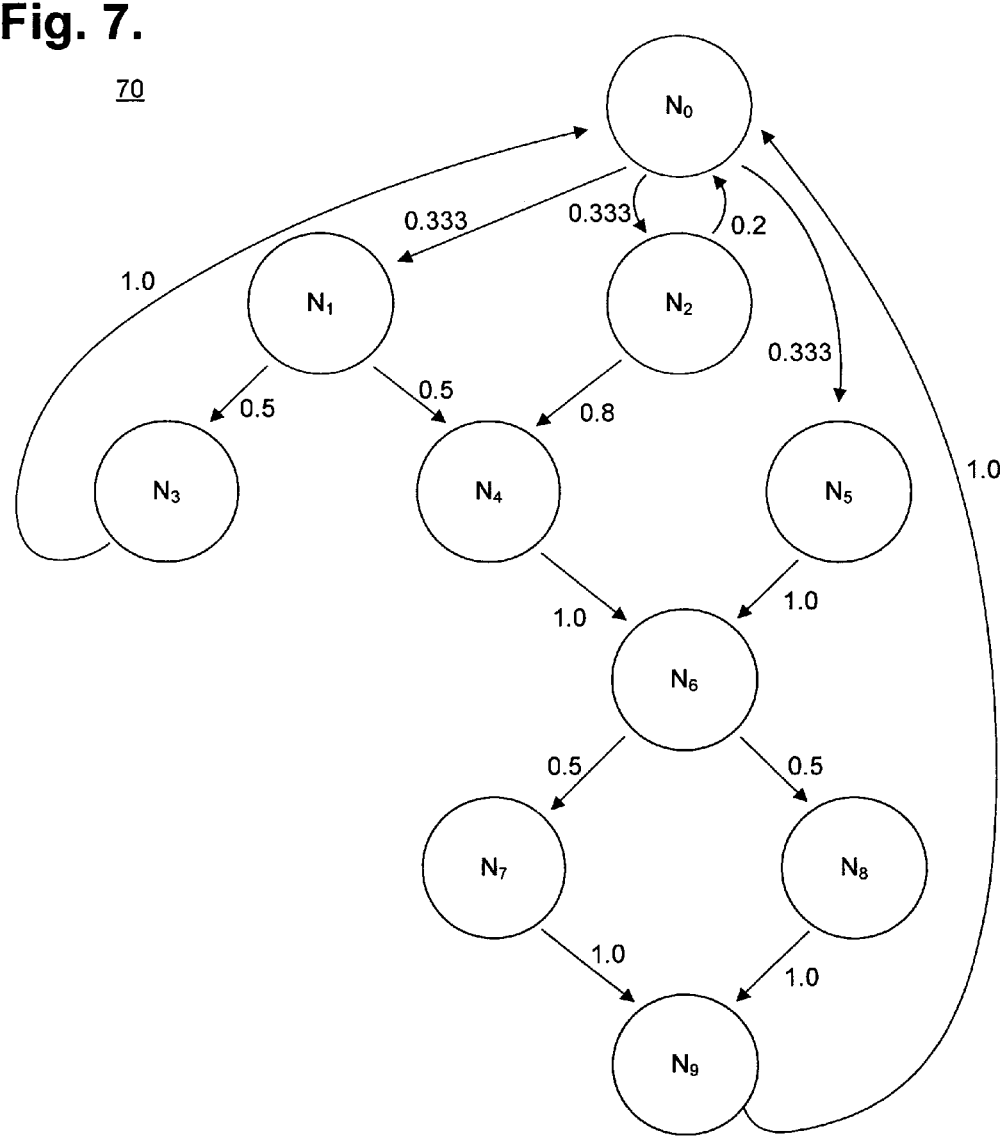
FIG. 7 is a tree diagram showing, by way of example, an activation network of the Web page hierarchy of FIG. 2.

For each Web page, the weighted keywords vector 61 is applied to determine the likelihoods of a user traversing each hyperlink. FIG. 7 is a tree diagram showing, by way of example, an activation network 70 of the Web page hierarchy 20 of FIG. 2. The degree of similarity between the proximal cues 34 associated with the hyperlinks on each Web page and an information goal 64 is known as an information scent, which represents the likelihood of a user selecting the hyperlink.

The information scents for an entire Web site can be mapped into an activation network 70 of probabilities for use in simulating user traffic flow through the Web site based upon the information goal 64, such as described in commonly-assigned U.S. Pat. No. 7,203,899, issued on Apr. 10, 2007, the disclosure of which is incorporated by reference. The activation network 70 is a directed graph with arcs representing each hyperlink drawn from a referencing Web page to a referenced Web page. Each Web page in the Web site being mapped has a corresponding node $N_i$ in the activation network 70. The probability of a user selecting a particular hyperlink in light of their information goal is represented as a weight assigned to the corresponding arc in the activation network 70. For instance, the node $N_0$ represents a home Web page and the nodes $N_1$, $N_2$, and $N_5$, each have an equal probability of being selected. For purposes of illustration, no sinks, that is, dead-end terminal nodes, are allowed and an arc to the top-most node $N_0$ is provided to represent a hyperlink referencing back to the home Web page. Other forms of mapping the probabilistic behaviors of users are possible.

The activation network 70 is a form of Bayesian probabilistic network that can be represented mathematically as a two-dimensional activation vector. The individual nodes $N_i$ are represented along each dimension of the activation vector. Each row represents a starting node and each column represents a destination node. The information scent, that is, the probability of a user traveling along a particular arc in the activation network 70, is entered as a value in the activation vector. The activation vector is also referred to as the scent matrix S. The activation vector for the activation network 70 can be expressed as:

$$\begin{bmatrix} 0.000 & 0.333 & 0.333 & \ldots & 0.000 \\ 0.000 & 0.000 & 0.000 & \ldots & 0.000 \\ 0.000 & 0.200 & 0.000 & \ldots & 0.000 \\ . & . & . & \ldots & . \\ . & . & . & \ldots & . \\ . & . & . & \ldots & . \\ 1.000 & 0.000 & 0.000 & \ldots & 0.000 \end{bmatrix}$$

A traversal through the activation network 70, representing "surfing" of the corresponding Web site, can be simulated through matrix multiplication. The starting point within the activation network 70 corresponding to the starting, frequently home, Web page is expressed as an entry vector $\overline{E}$, with the value 1.0 in the position of the starting point. For example, entry vector $\overline{E}$ for a starting point in the activation network 70 corresponding to the home Web page 21 (shown in FIG. 2) can be expressed as:

$$\begin{bmatrix} 1.000 \\ 0.000 \\ 0.000 \\ . \\ . \\ . \\ 0.000 \end{bmatrix}$$

The scent matrix S is multiplied by the entry vector $\overline{E}$ to obtain an activation vector $A_1$, which simulates the selection of a single hyperlink in the Web site. The spreading activation for each successive selection can be simulated by multiplying the scent matrix S by successive activation vectors $A_i$. The cumulative user satisfaction surfing through a Web site can be determined by taking a summation over each activation vector $A_i$, which can be expressed as:

$$A_{(i)} = A_{i-1} \cdot S$$

User attrition from the Web site can be simulated by multiplying each activation vector $A_i$ by a constant decay factor $\alpha$, which can be expressed as:

$$A_{(i)} = \alpha A_{i-1} \cdot S$$

Finally, new users "entering" the Web site can be simulated by adding a growth constant E to each activation vector result, which can be expressed as:

$$A_{(i)} = \alpha A_{i-1} \cdot S + E$$

Following user traffic flow simulation, the resulting activation vector $A_n$ specifies the number of users at each node after n selections. Simulating those users that have reached a particular target Web page 23 can be simulated by zeroing out the row in the scent matrix S corresponding to the node $N_i$ in the activation network 70 that represents the target Web page 23. Other forms of simulating user traffic flow is possible.

Process Flow Diagram

Figure 8:
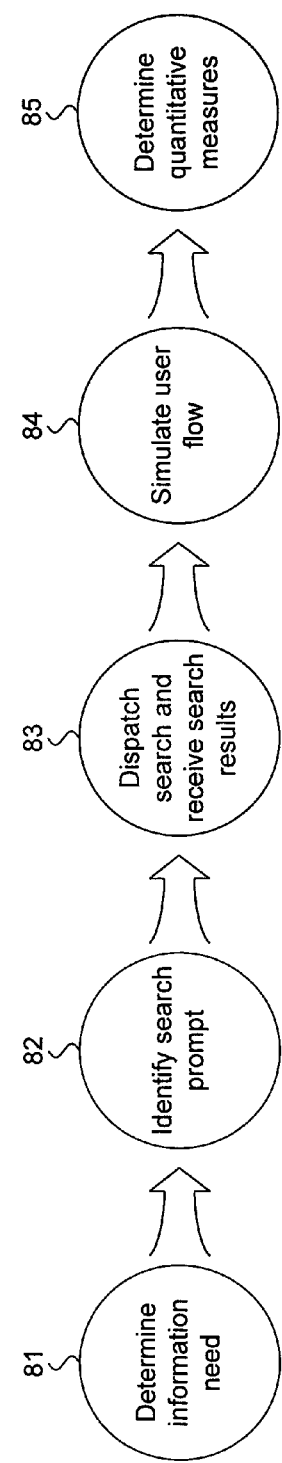
FIG. 8 is a process flow diagram showing a method for determining a quantitative measure of search efficiency of related Web pages, in accordance with one embodiment.

Search feature efficiency is evaluated by using the search capability provided with the Web site to identify a set of search results based on an information goal and simulating user traffic flow starting at one or more of the search results. FIG. 8 is a process flow diagram 80 showing a method for determining a quantitative measure of search efficiency of the Web pages in xxx a Web site, in accordance with one embodiment.

The search prompt, dialogue or other means by which keywords can be submitted to the Web site for searching are identified (operation 82). In one embodiment, a Visual BASIC parser is used to identify a search prompt by evaluation of the page description code. Other search prompt identification methodologies are possible.

The information goal is submitted through a search prompt and dispatched, from which search results are subsequently received (operation 83). The execution time of the search is tracked and user traffic flow is simulated through the search results (operation 84). Each search result serves as a starting point for use traffic flow simulations and the results are evaluated through an activation vector to generate quantified results (operation 85).

Information Scent Absorption Rate

Figure 9:
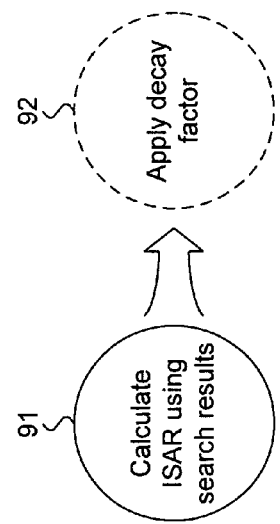
FIG. 9 is a process flow diagram showing determination of an information scent absorption rate for use with the method of FIG. 8.
Figure 10:
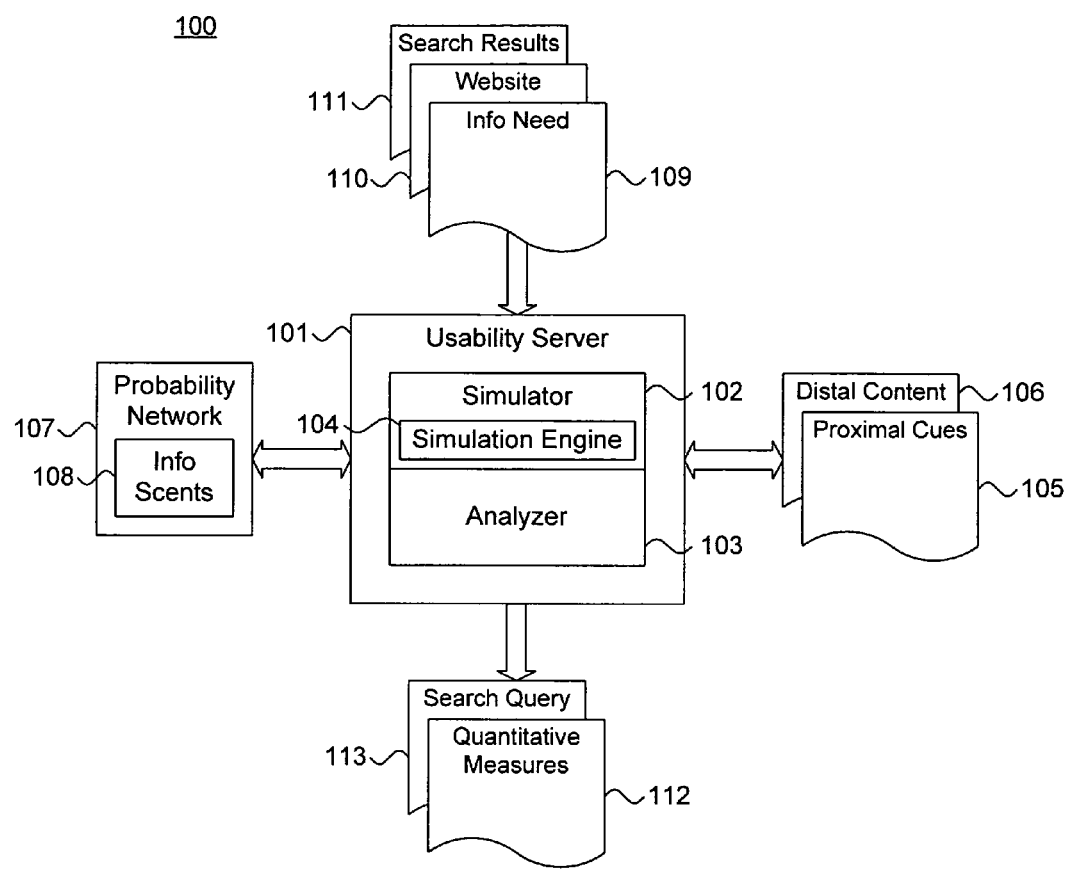
FIG. 10 is a functional block diagram showing a system for determining a quantitative measure of search efficiency of related Web pages, in accordance with one embodiment.

The information absorption rate is a metric that reflects the cumulative information scent collected along a particular path for a given information need. The information scent absorption rate reflects the goodness of the search. FIG. 9 is a process flow diagram 90 showing determination of an information scent absorption rate for use with the method 80 of FIG. 8. The information scent absorption rate is calculated by using the search results as a starting point (operation 91). In one embodiment, each search result is applied and a quantitative metric is generated as a net result of user traffic flow simulation, such as described in commonly-assigned U.S. Pat. No. 7,203,899, issued on Apr. 10, 2007, the disclosure of which is incorporated by reference. In a further embodiment, a linear bias is applied to the search results to favor the search results appearing in earliest order over those search results appearing later. In a still further embodiment, those search results that appear below the fold, that is, at the bottom of the display area of the Web page, are discounted to favor the probability of those hyperlinks appearing within the display area. Other types of information scent absorption rate calculations are possible. Finally, in a still further embodiment, a decaying factor can be applied to the simulation to simulate user attrition (operation 92).

System Diagram

A usability server can be used to automatically infer the usability of the Web pages in a Web site by simulating users surfing for specific information goals to generate quantitative usability metrics. FIG. 9 is a functional block diagram 100 showing a system for determining a quantitative measure of qualitative usability of a Web site, in accordance with one embodiment. A usability server 101 can be implemented as part of or separately from a Web server. The usability server 101 executes a sequence of programmed process steps, such as described above with reference to FIG. 8, implemented, for instance, on a programmed digital computer system.

The usability server 101 includes a simulator 102 and analyzer 103. Other modules are possible. The simulator 102 includes a simulation engine 104 for simulating user flow through a Web site 110 accompanied by an information need 109 that the simulation engine 104 seeks to fulfill through searching provided by a search server 14. The Web site 110 includes a set of two or more Web pages that each include content and contain one or more hyperlinks referencing at least one other Web page. A search dialogue is located within the Web site 110 and the information need 109 is sent to the search server 14 as a search query 113. The execution time of the search is tracked and search results 111 received back from the search server 14 are used as the starting Web pages for a user traffic flow simulation.

The analyzer 103 generates quantitative measures 112 based on an analysis of the usability of the Web site 110 through the user traffic flow simulation performed by the simulator 102. Information in each Web page of the search results 111 accompanying each hyperlink is identified as proximal cues 105, which are associated with distal content 106 contained on the referenced Web page. The proximal cues 105 are compared against the information need 109 to generate information scents 108 that represent the probability that a simulated user would select a particular hyperlink. The set of information scents 108 can be formed into a probability network 107, through which user traffic flow can be simulated and quantitative measures 112 generated in the form of an activation vector $A_i$, such as further described above with reference to FIG. 7.

While the invention has been particularly shown and described as referenced to the embodiments thereof, those skilled in the art will understand that the foregoing and other changes in form and detail may be made therein without departing from the spirit and scope.

What is claimed is:

1. A programmed digital computing device implemented system for determining a quantitative measure of search efficiency of related Web pages, comprising:
   a storage device configured to store a search query comprising one or more submitted keywords and a plurality of related Web pages;
   a processor comprising:
     an input module configured to identify a target Web page within the plurality of Web pages;
     a search function module configured to identify potential Web pages comprised in the related Web pages that each satisfies the search query as search results;
     a results module configured to list the potential Web pages that include at least one hyperlink referencing another of the potential Web pages and that each comprise proximal cues describing distal content of the other potential Web pages referenced by the hyperlink;
     a network generation module configured to generate an activation network, comprising:
       a graphing module configured to build a directed graph comprising nodes corresponding to the listed potential Web pages and arcs corresponding to the hyperlinks; and
       a weighting module configured to assign a weight to each arc to represent a probability of traversal of the corresponding hyperlink by comparing the keywords in the search query to the proximal cues included in each of the potential Web pages;
     a simulator module comprising:
       a selector module configured to select a node from the directed graph;
       a designator module configured to define traversals through the activation network from the selected node to the node corresponding to the target Web page; and
       an evaluator module configured to compute the probability of finding the target Web page as a quantitative measure of search efficiency, by calculating a product of the weights of the arcs along each traversal between the selected node and the node associated with the target Web page and by summing the product of the weights of the traversals; and
   a display configured to display the probability of finding the target Web page as a quantitative measure of search efficiency.

2. A system according to claim 1, wherein a decay factor is applied to simulate user attrition from the Web pages.

3. A system according to claim 1, further comprising:
   a simulation engine module configured to simulate usage of the Web pages by a population of users, comprising iteratively traversing through the activation network.

4. A system according to claim 1, wherein the probability of traversing each such hyperlink is biased to favor the potential Web pages appearing in earlier linear display order than other such potential Web pages.

5. A system according to claim 1, wherein the probability of traversing each such hyperlink is biased to favor the potential Web pages initially appearing within a display over other such potential Web pages appearing outside of the display.

6. A system according to claim 1, further comprising:
   an analyzer module configured to perform keyword expansion of the keywords.

7. A system according to claim 1, further comprising:
   an analyzer module configured to identify a search prompt in the Web pages.

8. A system according to claim 1, further comprising:
   a simulation engine module configured to determine the quantitative measure in accordance with the equation:

$$A_i = A_{i-1} \cdot S$$

where S is a starting activation vector representing the activation network and $A_i$ is a successive activation vector determined after i traversals.

9. A system according to claim 1, further comprising:
   a simulation engine configured to determine the quantitative measure with a decay factor in accordance with the equation:

$$A_i = \alpha A_{i-1} \cdot S$$

where S is a starting activation vector representing the activation network, $A_i$ is a successive activation vector determined after i traversals, and $\alpha$ is a decay factor.

10. A system according to claim 1, further comprising:
    a simulation engine configured to determine the quantitative measure with a growth constant in accordance with the equation:

$$A_i = A_{i-1} \cdot S + E$$

where S is a starting activation vector representing the activation network, $A_i$ is a successive activation vector determined after i traversals, and E is a growth constant.

11. A method for determining a quantitative measure of search efficiency of related Web pages, comprising:
    specifying a plurality of related Web pages;
    identifying a target Web page within the related Web pages;
    submitting a search query comprising one or more keywords;
    identifying potential Web pages comprised in the related Web pages that each satisfies the search query as search results;
    listing the potential Web pages that include at least one hyperlink referencing another of the potential Web pages and that each comprise proximal cues describing distal content of the other potential Web pages referenced by the hyperlink;
    generating an activation network, comprising:
      building a directed graph comprising nodes corresponding to the listed potential Web pages and arcs corresponding to the hyperlinks; and
      assigning a weight to each arc in the directed graph to represent a probability of traversal of the corresponding hyperlink by comparing the keywords of the search query to the proximal cues included in each of the potential Web pages;

selecting a starting node from the directed graph;
defining traversals through the activation network from the starting node to the node corresponding to the target Web page;
evaluating the probability of finding the target Web page as a quantitative measure of search efficiency, comprising:
calculating a product of the weights of the arcs along each traversal between the selected node and the node associated with the target Web page; and
summing the product of the weights of the traversals; and
displaying the quantitative measure of search efficiency.

12. A method according to claim 11, further comprising:
applying a decay factor to simulate user attrition from the Web pages.

13. A method according to claim 11, further comprising:
simulating usage of the Web pages by a population of users, comprising iteratively traversing through the activation network.

14. A method according to claim 11, further comprising:
biasing the probability of traversing each such hyperlink to favor the potential Web pages appearing in earlier linear display order than other such potential Web pages.

15. A method according to claim 11, further comprising:
biasing the probability of traversing each such hyperlink to favor the potential Web pages initially appearing within a display over other such potential Web pages appearing outside of the display.

16. A method according to claim 11, further comprising:
performing keyword expansion of the search query.

17. A method according to claim 11, further comprising:
identifying a search prompt in the Web pages.

18. A method according to claim 11, further comprising:
determining the quantitative measure in accordance with the equation:

$$A_i = A_{i-1} \cdot S$$

where S is a starting activation vector representing the activation network and $A_i$ is a successive activation vector determined after i traversals.

19. A method according to claim 11, further comprising:
determining the quantitative measure with a decay factor in accordance with the equation:

$$A_i = \alpha A_{i-1} \cdot S$$

where S is a starting activation vector representing the activation network, $A_i$ is a successive activation vector determined after i traversals, and $\alpha$ is a decay factor.

20. A method according to claim 11, further comprising:
determining the quantitative measure with a growth constant in accordance with the equation:

$$A_i = A_{i-1} \cdot S + E$$

where S is a starting activation vector representing the activation network, $A_i$ is a successive activation vector determined after i traversals, and E is a growth constant.

21. A programmed digital computing device holding code for performing the method according to claim 11.

22. A programmed digital computing device implemented system for determining a quantitative measure of search efficiency of a Web site, comprising:
a storage device configured to store a search query comprising one or more keywords and a Web site comprising a plurality of Web pages;
a processor comprising:
an input module configured to identify a target Web page within the Web site;
a search prompt provided by the Web site for the submission of the keywords to generate a set of search results comprising a plurality of potential Web pages that each includes content that satisfies the keywords and at least one hyperlink referencing another potential Web page with proximal cues describing distal content of the other potential Web page;
a network generation module configured to generate a logically-defined activation network, comprising:
a directed graph built with nodes corresponding to the potential Web pages and arcs corresponding to the embedded hyperlinks; and
a weight assigned to each arc to represent a probability of traversal of the corresponding hyperlink by comparing the keywords in the search query to the proximal cues included in the potential Web page;
a simulator module comprising:
a selector module configured to select a node in the directed graph;
a designator module configured to define traversals through the activation network from the selected node to the node corresponding to the target Web page; and
an evaluator module to evaluate the weights of the arcs along the traversals as a quantitative measure of search efficiency, wherein the quantitative measure is determined in accordance with at least one equation selected from the set, comprising:

$$A_i = A_{i-1} \cdot S;$$

$$A_i = \alpha A_{i-1} \cdot S; \text{ and}$$

$$A_i = A_{i-1} \cdot S + E$$

where S is a starting activation vector representing the activation network, $A_i$ is a successive activation vector determined after i traversals, $\alpha$ is a decay factor, and E is a growth constant; and
a display configured to display the quantitative measure of search efficiency.

23. A system according to claim 22, wherein the probability of traversing each such hyperlink is biased to favor the potential Web pages appearing in earlier linear display order than other such potential Web pages.

24. A system according to claim 22, wherein the probability of traversing each such hyperlink is biased to favor the potential Web pages initially appearing within a display over other such potential Web pages appearing outside of the display.

25. A method for determining a quantitative measure of search efficiency of a Web site, comprising:
specifying a search query comprising one or more keywords;
identifying a target Web page in a Web site comprising a plurality of related Web pages;
submitting the keywords into a search prompt provided by the Web site and receiving a set of search results comprising a plurality of potential Web pages, each potential Web page including content and at least one hyperlink referencing another potential Web page with proximal cues describing distal content of the other potential Web page;
generating a logically-defined activation network, comprising:
building a directed graph with nodes corresponding to the potential Web pages and arcs corresponding to the embedded hyperlinks; and assigning a weight to each arc to represent a probability of traversal of the corresponding hyperlink by comparing the keywords in the search query to the proximal cues included in the potential Web page;

selecting a node from the directed graph;

defining a traversal through the activation network from the selected node to the node corresponding to the target Web page; and evaluating a quantitative measure of search efficiency to the traversal, wherein the quantitative measure is determined in accordance with at least one equation selected from the set, comprising:

$A_i = A_{i-1} \cdot S;$ $A_i = \alpha A_{i-1} \cdot S;$ and $A_i = A_{i-1} \cdot S + E$ where S is a starting activation vector representing the activation network, $A_i$ is a successive activation vector determined after i traversals, $\alpha$ is a decay factor, and E is a growth constant.

26. A method according to claim 25, further comprising:
biasing the probability of traversing each such hyperlink to favor the potential Web pages appearing in earlier linear display order than other such potential Web pages.

27. A method according to claim 25, further comprising:
biasing the probability of traversing each such hyperlink to favor the potential Web pages initially appearing within a display over other such potential Web pages appearing outside of the display.

28. A programmed digital computing device holding code for performing the method according to claim 25.

* * * * *